No. 790,881. PATENTED MAY 30, 1905.
H. J. BRESSON & E. W. KING.
GAS STOVE.
APPLICATION FILED JAN. 4, 1905.
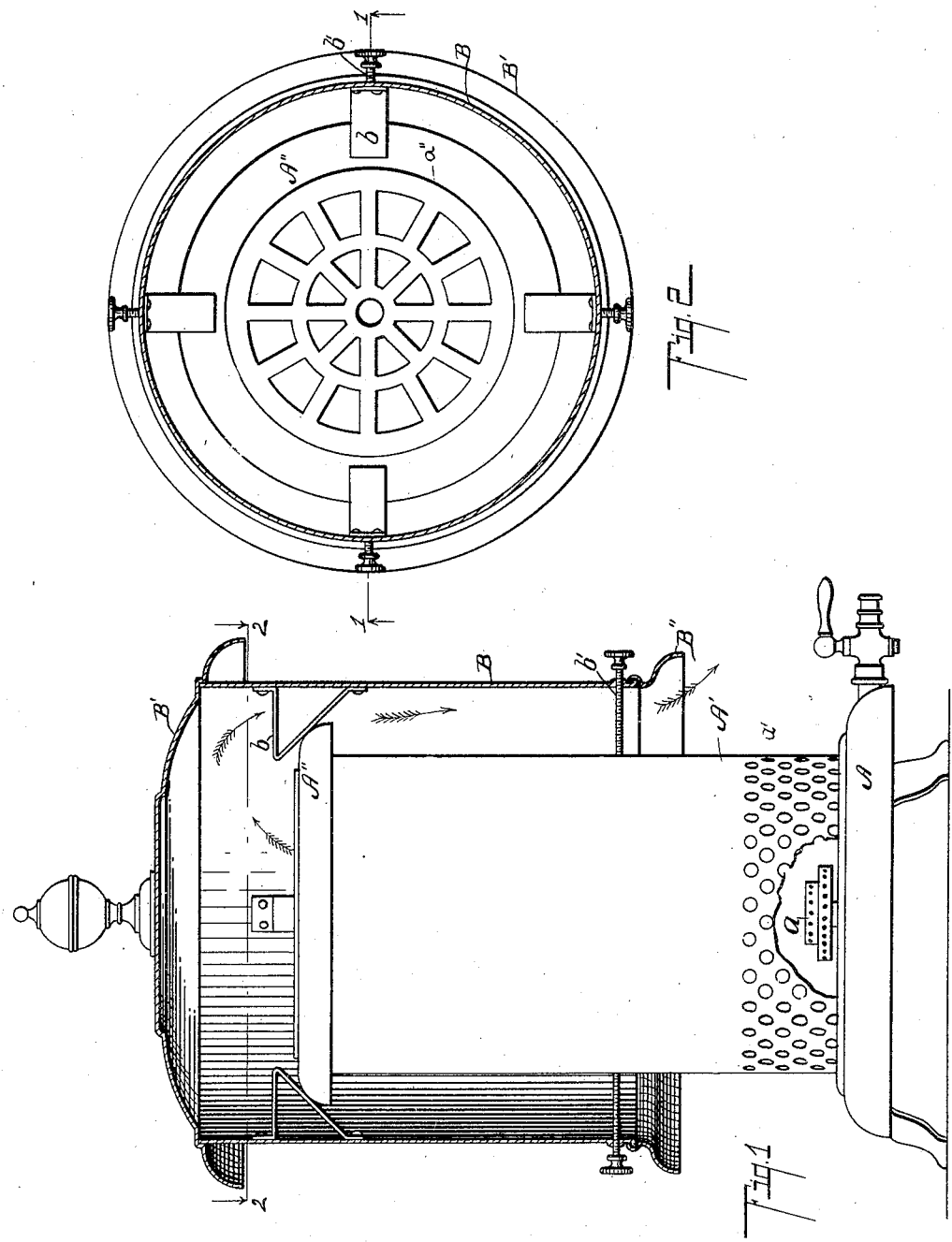
Witnesses:
Inventors
Henry J Bresson & Ernest W. King
By Chappell & Earl
Att'y.

No. 790,881. Patented May 30, 1905.

UNITED STATES PATENT OFFICE.

HENRY J. BRESSON AND ERNEST W. KING, OF KALAMAZOO, MICHIGAN; SAID KING ASSIGNOR TO SAID BRESSON.

GAS-STOVE.

SPECIFICATION forming part of Letters Patent No. 790,881, dated May 30, 1905.

Application filed January 4, 1905. Serial No. 239,650.

*To all whom it may concern:*

Be it known that we, HENRY J. BRESSON and ERNEST W. KING, citizens of the United States, and residents of the city and county of Kalamazoo, State of Michigan, have invented certain new and useful Improvements in Gas-Stoves, of which the following is a specification.

This invention relates to improvements in gas-stoves.

It relates particularly to gas-stoves for heating purposes.

The objects of this invention are, first, to provide an improved gas-stove by which a maximum amount of heat is secured from the gas consumed; second, to provide an improved gas-stove by which the heat is delivered close to the floor.

Further objects and objects relating to structural details will definitely appear from the detailed description to follow.

We accomplish the objects of our invention by the devices and means described in the following specification. The invention is clearly defined, and pointed out in the claims.

A structure embodying the features of our invention is clearly illustrated in the accompanying drawings, forming a part of this specification, in which—

Figure 1 is a detail side elevation view, partially in section, on a line corresponding to line 1 1 of Fig. 2, of a structure embodying the features of our invention, portions being broken away to show the arrangements of the parts. Fig. 2 is a horizontal sectional view taken on a line corresponding to line 2 2 of Fig. 1.

In the drawings the sectional views are taken looking in the direction of the little arrows at the ends of the section-lines, and similar letters of reference refer to similar parts throughout the several views.

Referring to the drawings, A is the base, which may be of any desired form or construction. A suitable gas-burner $a$ is provided. We provide an inner casing or stove-body proper, A', which is supported on the base A. This casing A' is provided with suitable air-inlet openings at its lower end. The top plate A'' for the inner casing A' is provided with a suitable downturned rim and has a central opening therethrough to receive the grate or griddle $a''$. (See Fig. 2.)

Arranged over the upper end of the casing A' and extending well toward the bottom thereof is an outer casing B, open only at its lower end. This casing is provided with inwardly-projecting upwardly-inclined arms $b$, arranged toward the top, adapted to rest upon the top plate A'' of the inner casing.

The top B' of the outer casing B is preferably conformed to secure the desired ornamental effect. The outer casing B is provided with an outwardly and downwardly flaring rim B'' at its lower end, which tends to deflect the heated air or gases outwardly from the stove. Thumb-screws $b'$ are arranged through the casing B, at its lower end, for securing the same rigidly in position on the inner casing and to prevent its swinging upon its supporting-arms $b$.

In use the heated air and gases pass upwardly through the inner casing A and out of the top thereof into the outer casing B, from which they are forced out at the bottom, as is indicated by the arrows in Fig. 1. This delivers the same close to the floor, and the outwardly-flaring rim at the bottom of the casing gives them an outward direction.

The casing B forms an air-chamber about the upper end of the casing A, which is at all times when the stove is in use filled with the heated gases and provides a comparatively large radiating-surface for the stove. The outer casing B may be readily removed should it be desired to place any article on the griddle $a$ for cooking purposes.

By inclining the supporting-arms $b$ upwardly and inwardly, as we have illustrated, it is not necessary to make the outer casing to fit any special size of stove, as it is adapted to stoves of varying diameters. The thumb-screws $b'$ may be adjusted to secure the outer casing in position or to release the same, so that it may be quickly removed or put in position, as occasion requires.

Our improved stove is very economical to produce and is at the same time very durable. We have illustrated and described the same in detail in the form preferred by us on account of its structural simplicity and economy. We desire, however, to state that it can be varied considerably in structural details without departing from our invention.

Having thus described the invention, what is claimed as new, and desired to be secured by Letters Patent, is—

1. In a gas-stove, the combination of a suitable base; a burner; an inner casing open at its upper end, having perforations therethrough about said burner; an outer casing open only at its lower end, and having an outwardly and downwardly projecting flange at its lower end, arranged over said inner casing to form an air-chamber about the upper portion thereof; inwardly and upwardly projecting supporting-arms on said outer casing adapted to rest on said inner casing; and thumb-screws arranged through the walls of said outer casing toward its lower end, adapted to be adjusted to engage said inner casing, for the purpose specified.

2. In a gas-stove, the combination of a suitable base; a burner; an inner casing open at its upper end; an outer casing open at its lower end, and having an outwardly and downwardly projecting flange at its lower end, arranged over said inner casing to form an air-chamber about the upper portion thereof; inwardly and upwardly projecting supporting-arms on said outer casing adapted to rest on said inner casing; and thumb-screws arranged through the walls of said outer casing toward its lower end, adapted to be adjusted to engage said inner casing, for the purpose specified.

3. In a gas-stove, the combination of a suitable base; a burner; an inner casing open at its upper end, having perforations therethrough about said burner; an outer casing open only at its lower end, arranged over said inner casing to form an air-chamber about the upper portion thereof; inwardly and upwardly projecting supporting-arms on said outer casing adapted to rest on said inner casing; and thumb-screws arranged through the walls of said outer casing toward its lower end, adapted to be adjusted to engage said inner casing, for the purpose specified.

4. In a gas-stove, the combination of a suitable base; a burner; an inner casing open at its upper end; an outer casing open only at its lower end, arranged over said inner casing to form an air-chamber about the upper portion thereof; inwardly and upwardly projecting supporting-arms on said outer casing adapted to rest on said inner casing; and thumb-screws arranged through the walls of said outer casing toward its lower end, adapted to be adjusted to engage said inner casing, for the purpose specified.

5. In a gas-stove, the combination of a suitable base; a burner; an inner casing open at its upper end, having perforations therethrough about said burner; an outer casing open only at its lower end, and having an outwardly and downwardly projecting flange at its lower end, arranged over said inner casing to form an air-chamber about the upper portion thereof; inwardly and upwardly projecting supporting-arms on said outer casing adapted to rest on said inner casing; for the purpose specified.

6. In a gas-stove, the combination of a suitable base; a burner; an inner casing open at its upper end having perforations therethrough about said burner; an outer casing open only at its lower end, arranged over said inner casing to form an air-chamber about the upper portion thereof; inwardly and upwardly projecting supporting-arms on said outer casing adapted to rest on said inner casing, for the purpose specified.

7. In a gas-stove, the combination of a suitable base; a burner; an inner casing open at its upper end having perforations therethrough about said burner; an outer casing open only at its lower end, and having an outwardly and downwardly projecting flange at its lower end, arranged over said inner casing to form an air-chamber about the upper portion thereof; inwardly-projecting supporting-arms on said outer casing adapted to rest on said inner casing; and thumb-screws arranged through the walls of said outer casing toward its lower end, adapted to be adjusted to engage said inner casing, for the purpose specified.

8. In a gas-stove, the combination of a suitable base; a burner; an inner casing open at its upper end; an outer casing open only at its lower end, arranged over said inner casing to form an air-chamber about the upper portion thereof; inwardly-projecting supporting-arms on said outer casing adapted to rest on said inner casing; and thumb-screws arranged through the walls of said outer casing toward its lower end, adapted to be adjusted to engage said inner casing, for the purpose specified.

9. In a gas-stove, the combination of a suitable base; a burner; an inner casing open at its upper end, having perforations therethrough about said burner; an outer casing open only at its lower end, and having an outwardly and downwardly projecting flange at its lower end, arranged over said inner casing to form an air-chamber about the upper portion thereof; inwardly-projecting supporting-arms on said outer casing adapted to rest on said inner casing; for the purpose specified.

In witness whereof we have hereunto set our hands and seals in presence of two witnesses.

HENRY J. BRESSON. [L. S.]
ERNEST W. KING. [L. S.]

Witnesses:
AMELIA J. ALBER,
OTIS A. EARL.